(12) United States Patent
Belaidi et al.

(10) Patent No.: US 6,565,260 B2
(45) Date of Patent: May 20, 2003

(54) HIGH-CONNECTOR DENSITY INTERFACE PLATE

(75) Inventors: Hakim F. Belaidi, Durham, NH (US); Marlon Banta, Allston, MA (US)

(73) Assignee: Axe, Inc., Maynard, MA (US)

( * ) Notice: Subject to any disclaimer, the term of this patent is extended or adjusted under 35 U.S.C. 154(b) by 28 days.

(21) Appl. No.: 10/037,724

(22) Filed: Oct. 19, 2001

(65) Prior Publication Data

US 2003/0077041 A1 Apr. 24, 2003

(51) Int. Cl.[7] .................................................. G02B 6/36
(52) U.S. Cl. .......................................... 385/53; 385/135
(58) Field of Search .......................... 385/53, 134, 135, 385/136, 139

(56) References Cited

U.S. PATENT DOCUMENTS

| | | | | |
|---|---|---|---|---|
| 5,363,467 A | * | 11/1994 | Keith | 385/135 |
| 5,446,822 A | * | 8/1995 | Keith | 385/135 |
| 5,659,650 A | | 8/1997 | Arnett | 385/135 |
| 5,708,742 A | * | 1/1998 | Beun et al. | 385/53 |
| 5,892,870 A | * | 4/1999 | Fingler et al. | 385/59 |
| 5,956,449 A | * | 9/1999 | Otani et al. | 385/134 |
| 6,167,183 A | * | 12/2000 | Swain | 385/135 |
| 6,208,796 B1 | * | 3/2001 | Williams Vigliaturo | 385/135 |
| 6,236,795 B1 | * | 5/2001 | Rodgers | 385/134 |

* cited by examiner

*Primary Examiner*—Tulsidas Patel
(74) *Attorney, Agent, or Firm*—Kurt Rauschenbach Rauschenbach Patent Law Group, LLC

(57) ABSTRACT

A high-connector density interface plate comprising a curved outer surface having a plurality of interface connections is described. Each of the plurality of interface connections is adapted to receive a cable at an angle relative to a normal line extending from a normal angle to the curved outer surface. The curved outer surface increases the interface plate surface area available for interface connections relative to an interface plate having a flat outer surface.

23 Claims, 2 Drawing Sheets

HIGH-CONNECTOR DENSITY INTERFACE PLATE

FIELD OF THE INVENTION

The present invention relates to methods and apparatus for interfacing transmission lines to electrical and optical equipment. In particular, the present invention relates to methods and apparatus for interfacing a high-density of transmission lines, such as electrical cables and optical fibers, with equipment.

BACKGROUND OF THE INVENTION

Interface plates are used in networking equipment to provide an interface between connections external to a certain piece of equipment or circuit card and connections on a circuit card or opto-electrical circuit pack housed within a chassis. Some interface plates are used to house connectors, such as connector barrels, mating sleeves, connectors, feedthroughs or adapters. These connector interface plates transmit signals between transmission lines terminated by a connector, such as electrical cables or optical fibers and electrical and optical equipment. In many known optical communication systems, fiber optical ribbon connectors or discrete optical fiber connectors are used to connect a plurality of optical fibers to the optical communication equipment.

Interfacing optical fibers to equipment is particularly difficult. Care must be taken when handling and connecting optical fiber cables to connectors because optical fibers cannot be wound or bent to a radius less than a predetermined minimum radius without the occurrence of microcracks, which may cause loss of data. Thus, practical high-density optical connectors must allow a technician to easily connect optical fibers to the optical connector. Practical high-density optical connectors must also allow a technician to easily disconnect optical fibers from connectors for cleaning or reconfiguring the system. For example, technicians may need to connect and disconnect and clean optical fibers connected to the equipment as part of installation, maintenance and repair.

Many state-of-the-art optical fiber communications system use wavelength division multiplexing (WDM), which is an optical transport technology that propagates many wavelengths in the same optical fiber. WDM systems effectively increase the aggregate bandwidth per fiber to the sum of the bit rates of each wavelength. Bandwidths greater than 1 terabit/sec have been demonstrated in WDM based communication systems.

Dense Wavelength Division Multiplexing (DWDM) is a technology that implements WDM technology in a communication system with a large number of wavelengths. DWDM is typically used to describe WDM technology that propagates more than 40 wavelengths in a single optical fiber. As the number of wavelengths in a DWDM communication system increases, the number of electrical cables and optical fibers required to interface with the DWDM system increases. Thus, the number of electrical cables and optical fibers that require connection to the interface plates increases. However, the surface area available to interface electrical cables and optical fibers in an equipment installation may be limited.

SUMMARY OF THE INVENTION

The present invention relates to high-density electrical and optical connectors. These connectors or mating sleeves reside on interface plates as described herein. In one embodiment, an interface plate according to the present invention includes a curved outer surface that extends over useful connector surface area in order to increase the number of electrical and optical connectors compared with a flat interface plate. The curved outer surface includes a plurality of interface connectors. In one embodiment, the interface plate includes connectors oriented at an angle relative to a normal line extending from a normal angle to the curved outer surface.

Accordingly, the present invention features a high-connector density interface plate comprising a curved outer surface having a plurality of interface connectors. Each of the plurality of interface connectors is adapted to receive a cable at an angle relative to a normal line extending from a normal angle to the curved outer surface. The curved outer surface increases the interface plate surface area available for interface connections relative to an interface plate having a flat outer surface.

In one embodiment, the interface connectors may be optical fiber connectors, such as optical fiber interface sleeves, adaptors, or barrels. For example, the interface connections may be for OC 768, OC192, OC48, or 10 Gigabit Ethernet (GE) optical fiber signals. The connectors or sleeves may be for a variety of optical connectors such as SC, FC, APC, ST, LC or Mu connectors. In another embodiment, the interface connectors may be electrical interface connectors, such as RF signal interface connectors, microwave signal interface connectors, and millimeter wave signal interface connectors.

In one embodiment, the angle of at least one of the plurality of interface connectors relative to the normal line extending from the normal angle to the curved outer surface is substantially zero. In another embodiment, the angle of at least one of the plurality of interface connectors relative to the normal line extending from the normal angle to the curved outer surface is non-zero. In yet another embodiment, the angle relative to the normal line extending from the normal angle to the curved outer surface for at least one of the plurality of interface connectors is different from another angle relative to another normal line extending from another normal angle to the curved outer surface for a different one of the plurality of interface connectors.

The present invention also features a signal interface for an optical fiber communication system that includes an interface plate having curved outer surface that is adapted to receive a plurality of interface connectors. The curved outer surface increases the surface area available for interface connectors relative to an interface plate having a flat outer surface. A plurality of interface connectors is positioned through the curved outer surface. Each of the plurality of interface connectors is adapted to receive an external transmission line at an angle relative to a normal line extending from a normal angle to the curved outer surface.

In one embodiment, the angle of at least one of the plurality of interface connectors relative to a normal line extending from a normal angle to the curved outer surface is substantially zero. In another embodiment, the angle of at least one of the plurality of interface connectors relative to a normal line extending from a normal angle to the curved outer surface is substantially non-zero. In yet another embodiment, the angle relative to the normal line extending from the normal angle to the curved outer surface for at least one of the plurality of interface connectors is different from another angle relative to another normal line extending from another normal angle to the curved outer surface for a different one of the plurality of interface connectors.

The present invention also features a method of connecting an optical fiber to an optical fiber communication system. The method includes positioning an interface connector having an internal port and an external port on an interface plate having a curved outer surface. The curved outer surface increases the surface area available for interface connectors relative to an interface plate having a flat outer surface.

An internal fiber optic cable is coupled to the internal port of the interface connector. An external fiber optic cable is coupled to the external port of the interface connector at an angle relative to a normal line extending from a normal angle to the curved outer surface. In one embodiment, the angle relative to the normal line extending from the normal angle is zero. In another embodiment, the angle relative to the normal line extending from the normal angle is non-zero.

BRIEF DESCRIPTION OF THE DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Optical communication system equipment is often located in transmission huts that have limited space. Because of the location of many transmission huts, the space cannot be increased. Consequently, optical communication system equipment providers are attempting to minimize the overall footprint of their equipment to reduce floor space requirements in central offices and transmission huts. Reducing the footprint generally means reducing the overall size of the equipment, including the front facing interface plate surface area that could be utilized for electrical and optical cable connections.

Thus, there is presently a need to interface a high density of electrical cables and optical fibers to optical communication systems. In addition, the required density of electrical and optical connectors is rapidly increasing because of advances in technology, such as DWDM technology.

Figure 1:
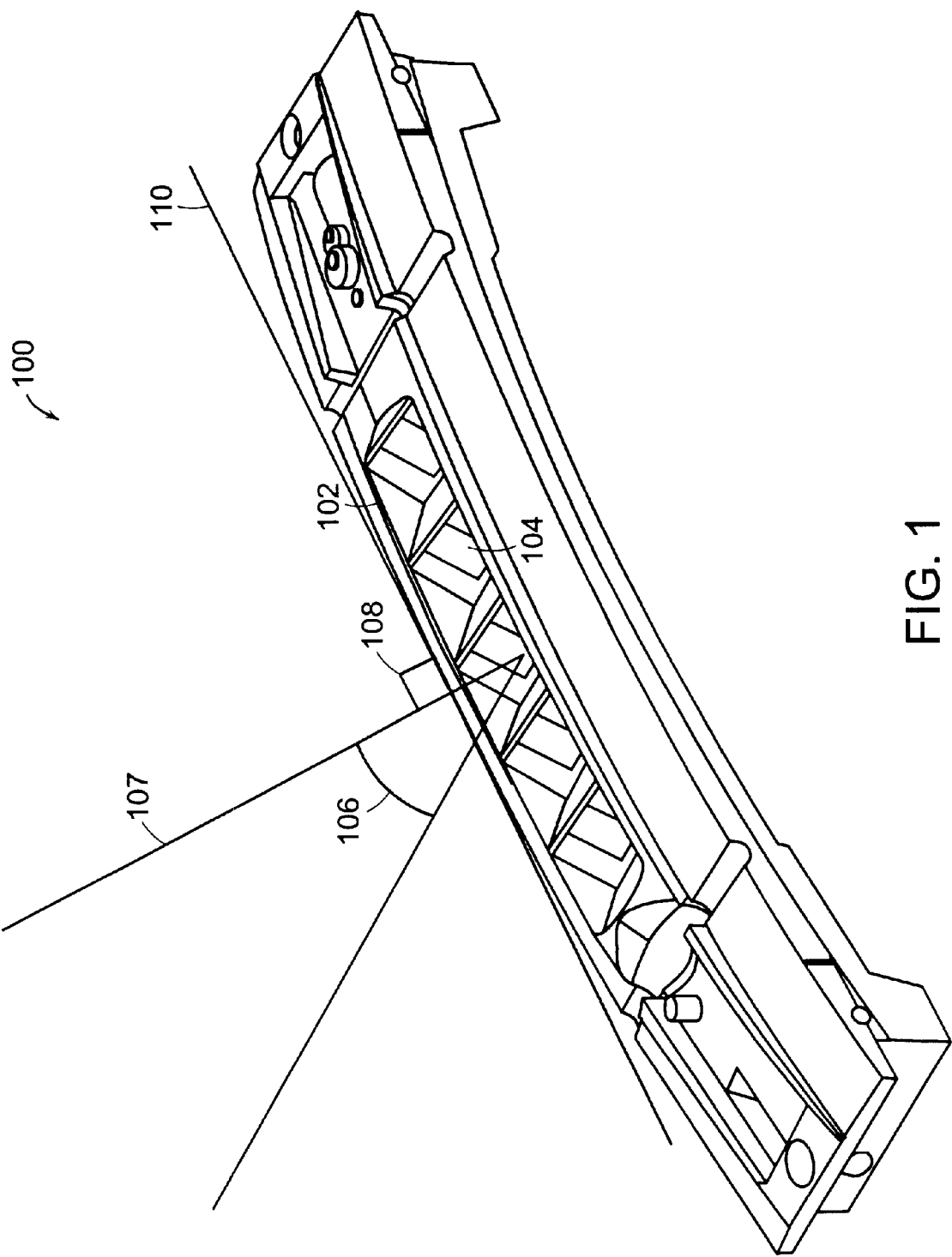
FIG. 1 illustrates an embodiment of an interface plate having a curved outer surface that increases the connector density according to the present invention.

Referring more particularly to the figures, FIG. 1 illustrates an embodiment of an interface plate 100 having a curved outer surface 102 that increases the connector density according to the present invention. The curved outer surface 102 is curved or bowed relative to an equipment housing (not shown) that receives the interface plate 100. In one embodiment, the interface plate 100 is removably attached to the equipment housing. For example, the interface plate 100 may be removably attached so that circuit cards (not shown) attached to the interface plate 100 can be easily removed.

The interface plate 100 also includes a plurality of interface connectors 104. Each of the plurality of interface connectors 104 is adapted to receive a transmission line (not shown) at an angle 106 relative to a normal line 107 extending from a normal angle 108 to the curved outer surface 102. By normal angle 108, we mean an angle relative to a normal line 107 that is perpendicular to a tangent line 110 to the curved outer surface 102. In one embodiment, at least one of the plurality of interface connectors 104 is adapted to receive a transmission line (not shown) at the normal angle 108 to the curved outer surface 102. In this embodiment, the angle 106 relative to the normal line 107 extending from the normal angle 108 to the curved outer surface 102 is equal to zero.

In another embodiment, one or more of the plurality of interface connectors 104 is adapted to receive a transmission line at a non-zero angle 106 relative to the normal line 107 extending from the normal angle 108 to the curved outer surface 102. In yet another embodiment, the angle 106 relative to the normal line 107 extending from the normal angle 108 is varied among the plurality of interface connectors 104. For example, the angle 106 relative to the normal line 107 extending from the normal angle 108 may be varied systematically among the plurality of interface connectors 104 to simplify a machine tool setup during manufacture of the interface plate 100. The angle 106 relative to the normal line 107 extending from the normal angle 108 may also be varied among the plurality of interface connectors 104 to optimize the routing of transmission lines (not shown) that are received by the plurality of interface connectors 104.

The plurality of interface connectors 104 may be any number of interface connectors. For example, the plurality of interface connectors 104 may be eight interface connectors 104. In one embodiment, the interface plate 100 is stepped or terraced as shown in FIG. 1. Terraced interface plates have greater structural strength than non-terraced interface plates. Also, terraced interface plates provide better access to individual interface connectors 104 than non-terraced interfaced plates. The interface connectors 104 in the terraced interface plate can have different lengths along the interface plate 100.

The plurality of interface connectors 104 can be adapted to receive any type of transmission line, such as an electrical cable for transmitting electrical signals or an optical fiber for transmitting optical pulses. The plurality of interface connectors 104 can also be adapted to receive an electrical wire for DC bias. The plurality of interface connectors 104 can include any type of electrical or optical connector. In one embodiment, the interface plate 100 includes electrical connectors, such as V, K, SMA, 2.5 mm, 3.5 mm, N, or BNC. In another embodiment, the interface plate 100 includes optical connectors, such as SC, LC, APC, ST, Mu or FC connectors. In other embodiments, the interface plate 100 includes both electrical and optical connectors.

In one embodiment, the interface plate 100 includes indicator lights (not shown) that indicate the operation of the card (not shown) attached to the interface plate 100. In addition, the interface plate 100 may have indicator lights (not shown) that indicate whether the electrical cable or optical fiber connections are properly made. For example, the indicator lights can be LED or LCD devices.

The interface plate 100 has several advantages over prior art interface plates. One advantage is that the curved outer surface 102 increases the surface area available for connecting transmission lines, such as electrical cables and optical fibers, relative to an interface plate having a flat outer surface (a flat interface plate) that would mount in the same position in an equipment housing. The ratio of the area of the curved interface plate 100 to the area of the flat interface plate can be expressed as $L_c/L$, where L is the length of the flat interface plate and $L_c$ is the length along the surface of the curved interface plate 100. $L_c/L$ can be approximately calculated by the formula:

$$\frac{L_c}{L} = \left(\frac{2R}{L}\right)\sin^{-1}\left(\frac{L}{2R}\right)$$

where R is an effective radius of curvature of the curved outer surface 102 of the interface plate 100. For example, a flat interface plate having a length of twelve inches can be compared with a curved interface plate 100, which would mount in the same position in an equipment housing, and have a ten inch radius of curvature along its length. In this example, $L_c/L=1.07$. The curved interface plate 100 of this example has a seven percent greater area available for connectors than does the flat interface plate.

A protrusion of the curved interface plate 100 beyond the plane of an equivalently mounted flat interface plate increases as the radius of curvature of the curved interface plate decreases. The amount of the protrusion T due to the curvature of the interface plate can be approximately calculated using the formula:

$$T = R - \left(R^2 - \frac{L^2}{4}\right)^{1/2}$$

where T is expressed in the same length units as R and L.

In the above example of a flat interface plate having a length of twelve inches, compared with a curved interface plate 100 that would mount in the same position in an equipment housing, the protrusion of the curved interface plate 100 is calculated to be two inches. The amount of curvature included in the curved interface plate 100 may be limited by an overall system depth requirement. For example, the overall depth of an equipment rack may be limited to six hundred millimeters, including any protrusion of the interface plate 100 beyond a mounting surface of an equipment rack.

The curved interface plate 100 of the present invention has a greater torsional stiffness than a flat interface plate that mounts in the same chassis space. In one embodiment, the interface plate 100 provides structural strength to the mounting surface of the equipment housing. In one embodiment, the interface plate 100 provides electromagnetic shielding. Also, in one embodiment, the interface plate 100 facilitates grounding.

Figure 2:
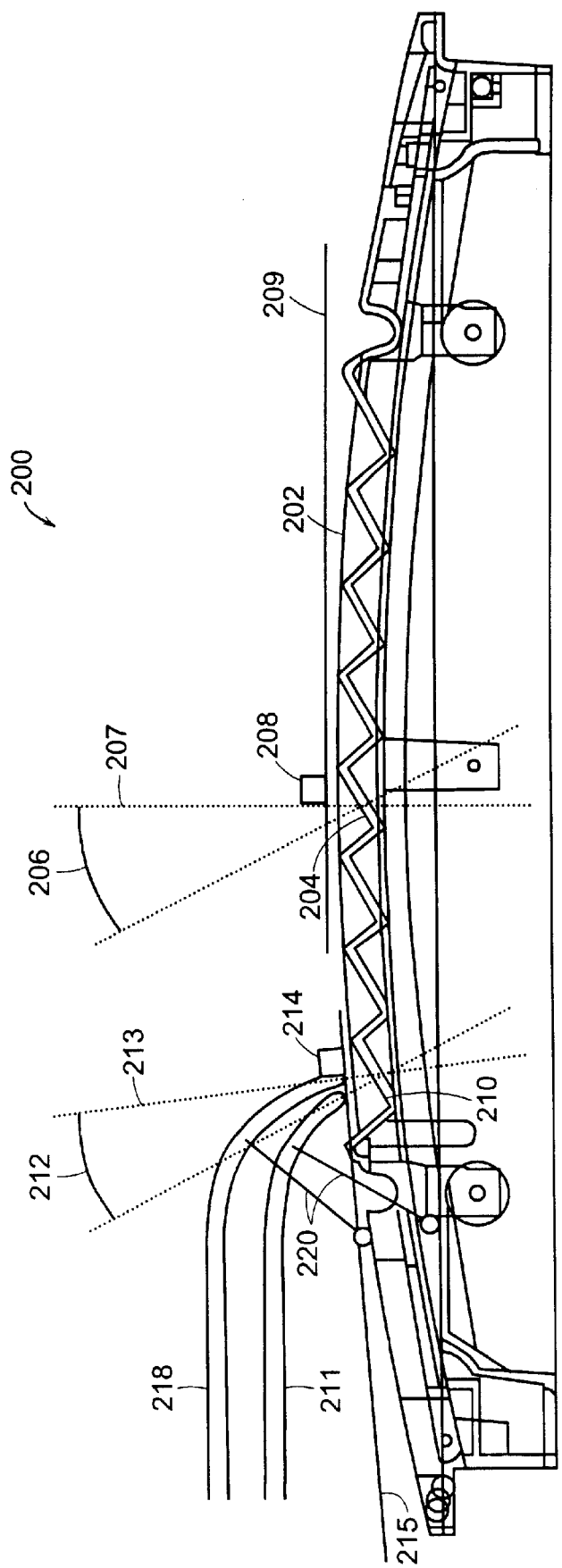
FIG. 2 illustrates an embodiment of an interface plate having a curved outer surface that increases the connector density according to the present invention and that has connectors at different angles relative to a normal line extending from a normal angle to the curved outer surface.

FIG. 2 illustrates another embodiment of an interface plate 200 having a curved outer surface 202 that increases the connector density according to the present invention. The interface plate 200 of FIG. 2 is similar to the interface plate 100 described in FIG. 1, except that the interface plate 200 is adapted to receive transmission lines at more than one angle relative to a normal line extending from a normal angle that is perpendicular to the direction of a tangent line to the curved outer surface 202.

The interface plate 200 includes a first interface connector 204 that is adapted to receive a transmission line (not shown) at a first angle 206 relative to a normal line 207 extending from a first normal angle 208 to the curved outer surface 202. The first normal angle 208 is the angle relative to a normal line 207 that is perpendicular to the direction of a first tangent line 209. The interface plate 200 also includes a second interface connector 210 that is adapted to receive a transmission line 211 at a second angle 212 relative to a normal line 213 extending from a second normal angle 214. The second normal angle 214 is the angle relative to a normal line 213 that is perpendicular to the direction of a second tangent line 215. In one embodiment, the first angle 206 relative to the normal line 207 extending from the first normal angle 208 and the second angle 212 relative to the normal line 213 extending from the second normal angle 214 are equal. In another embodiment, the first angle 206 relative to the normal line 207 extending from the first normal angle 208 and the second angle 212 relative to the normal line 213 extending from the second normal angle 214 are unequal.

Since the physical space occupied by optical communication equipment is limited, it is desirable to minimize the total volume that the equipment occupies. The total volume includes the volume of the equipment itself. In addition, the total volume includes a volume of space (the extended volume) that is occupied by the transmission lines that are routed to the interface plate 200 and that protrude beyond the curved front surface 202. The extended volume can be reduced by reducing the distance that the transmission lines protrude from the curved outer surface 202.

FIG. 2 illustrates the angled transmission line 211 that approaches the curved outer surface 202 at the second angle 212 relative to the normal line 213 extending from the second normal angle 214. FIG. 2 also illustrates a normal transmission line 218 that approaches the curved outer surface 202 at the second normal angle 214. The angled transmission line 211 and the normal transmission line 218 have the same minimum bend radius 220. The angled transmission line 211 protrudes less than the normal transmission line 218 from the curved outer surface 202. The angled transmission line 211 also defines a smaller extended volume than does the normal transmission line 218. In general, for a given minimum bend radius 220 of a transmission line, a larger second angle 212 relative to the normal line 213 reduces the extended volume.

The interface plates of the present invention perform multiple functions. One function is to provide a surface into which transmission line connectors or mating sleeves can be mounted. Another function is to make the equipment and/or circuit packs more rigid. Another function is to facilitate grounding. Yet another function is to make insertion and removal of the packs more predictable.

In one embodiment of the invention, a high-density 8-port OC-48 circuit pack can be constructed having a circuit pack size of approximately 12.25 inches (height), 16 inches (depth), and 1.151 inches (width) (30 mm). These dimensions are similar to dimensions of known 1-port OC-192 circuit packs.

Equivalents

While the invention has been particularly shown and described with reference to specific preferred embodiments, it should be understood by those skilled in the art that various changes in form and detail may be made therein without departing from the spirit and scope of the invention as defined by the appended claims. For example, the present invention may be practiced using any number of interface connectors in an interface plate. In addition, transmission lines may be received by interface connectors according to the present invention at any angles relative to the normal line.

What is claimed is:

1. A high-connector density interface plate comprising a curved outer surface having a plurality of interface connectors, each of the plurality of interface connectors being adapted to receive a transmission line at an angle relative to a normal line extending from a normal angle to the curved outer surface, wherein the curved outer surface increases the interface plate surface area available for interface connectors relative to an interface plate having a flat outer surface.

2. The interface plate of claim 1 wherein the angle relative to the normal line extending from the normal angle to the curved outer surface for at least one of the plurality of interface connectors is substantially zero.

3. The interface plate of claim 1 wherein the angle relative to the normal line extending from the normal angle to the curved outer surface for at least one of the plurality of interface connectors is different from another angle relative to another normal line extending from another normal angle to the curved outer surface for a different one of the plurality of interface connectors.

4. The interface plate of claim 1 wherein the interface plate is removably attached to a housing.

5. The interface plate of claim 1 wherein the interface plate is removably attached to a circuit board.

6. The interface plate of claim 1 wherein the interface connectors comprise optical fiber interface sleeves.

7. The interface plate of claim 1 wherein the interface connectors comprise FC optical fiber interface connectors.

8. The interface plate of claim 1 wherein the interface connectors comprise SC optical fiber interface connectors.

9. The interface plate of claim 1 wherein the interface connectors comprise LC optical fiber interface connectors.

10. The interface plate of claim 1 wherein the interface connectors comprise ST optical fiber interface connectors.

11. The interface plate of claim 1 wherein the interface connectors comprise APC optical fiber interface connectors.

12. The interface plate of claim 1 wherein the interface connectors comprise Mu optical fiber interface connectors.

13. The interface plate of claim 1 wherein the interface connectors comprise electrical interface connectors.

14. The interface plate of claim 1 wherein the interface connectors comprise RF signal interface connectors.

15. The interface plate of claim 1 wherein the interface connectors comprise microwave signal interface connectors.

16. The interface plate of claim 1 wherein the interface connectors comprise millimeter wave signal interface connectors.

17. The interface plate of claim 1 wherein the interface connectors comprise baseband signal interface connectors.

18. The interface plate of claim 1 wherein the interface connectors comprise pin interface connectors.

19. A signal interface for an optical fiber communication system, the signal interface comprising:

a) an interface plate having a curved outer surface that is adapted to receive a plurality of interface connectors, the curved outer surface increasing surface area available for interface connectors relative to an interface plate having a flat outer surface; and b) a plurality of interface connectors positioned through the curved outer surface, each of the plurality of interface connectors being adapted to receive an external transmission line at an angle relative to a normal line extending from a normal angle to the curved outer surface.

20. The signal interface of claim 19 wherein the angle relative to the normal line extending from the normal angle to the curved outer surface for at least one of the plurality of interface connectors is substantially zero.

21. The signal interface plate of claim 20 wherein the angle relative to the normal line extending from the normal angle to the curved outer surface for at least one of the plurality of interface connectors is different from another angle relative to another normal line extending from another normal angle to the curved outer surface for a different one of the plurality of interface connectors.

22. A method for connecting an optical fiber to an optical fiber communication system, the method comprising:

a) positioning an interface connector on a interface plate having a curved outer surface that increases surface area available for interface connectors relative to an interface plate having a flat outer surface, the interface connector having an internal port and an external port;

b) coupling an internal fiber optic cable to the internal port of the interface connector; and c) coupling an external fiber optic cable to the external port of the interface connector at an angle relative to a normal line extending from a normal angle to the curved outer surface.

23. The method of claim 22 wherein the angle relative to the normal line extending from the normal angle is zero.

* * * * *

UNITED STATES PATENT AND TRADEMARK OFFICE
CERTIFICATE OF CORRECTION

PATENT NO.    : 6,565,260 B2
DATED         : May 20, 2003
INVENTOR(S)   : Belaidi et al.

It is certified that error appears in the above-identified patent and that said Letters Patent is hereby corrected as shown below:

Column 8,
Line 21, should read as follows: replace "20" with -- 19 --

Signed and Sealed this

Second Day of September, 2003

JAMES E. ROGAN
*Director of the United States Patent and Trademark Office*